United States Patent [19]

Delalande

[11] Patent Number: 4,975,038

[45] Date of Patent: Dec. 4, 1990

[54] DEVICE FOR THE INJECTION OF A PLASTIC MATERIAL INTO A MOLD

[75] Inventor: Francois Delalande, Pierre de Bresse, France

[73] Assignee: Compagnie Europeenne de Composants Electroniques, Courbevoie, France

[21] Appl. No.: 379,383

[22] Filed: Jul. 13, 1989

[30] Foreign Application Priority Data

Jul. 22, 1988 [FR] France ................... 88 09937

[51] Int. Cl.$^5$ ............................................. B29C 45/23
[52] U.S. Cl. .................... 425/543; 251/343;
251/344; 251/347; 251/354; 264/328.14;
264/328.15; 425/547; 425/548; 425/549;
425/551; 425/563; 425/565
[58] Field of Search ............... 425/543, 547, 548, 549,
425/551, 557, 560, 562, 563, 564, 565, 566;
264/328.9, 328.14, 328.15, 328.19; 251/343,
344, 347, 349, 353, 354

[56] References Cited

U.S. PATENT DOCUMENTS

| | | | |
|---|---|---|---|
| 3,268,635 | 8/1966 | Kraus et al. | 425/543 |
| 3,797,984 | 3/1974 | Yago et al. | 425/543 |
| 3,843,293 | 10/1974 | Harville | 425/243 |
| 4,715,118 | 12/1987 | Bernard et al. | 29/856 |
| 4,811,914 | 3/1989 | Delalande | 242/56.1 |

FOREIGN PATENT DOCUMENTS

| | | |
|---|---|---|
| 11805 | 6/1980 | European Pat. Off. |
| 2108572 | 5/1972 | France |
| 2198386 | 6/1988 | United Kingdom |

*Primary Examiner*—Timothy Heitbrink
*Attorney, Agent, or Firm*—Pollock, VandeSande & Priddy

[57] ABSTRACT

A device for the injection of a plastic material in a mold having an injection head with an injection face designed to be placed in contact with the mold feeder channel. The injection head has an injection chamber supplied with plastic material by a feeder conduit. The plastic material is injected from the injection chamber to the mold feeder channel by means of a clack-valve system. The device also has a support for the injection head and an injection rod.

7 Claims, 3 Drawing Sheets

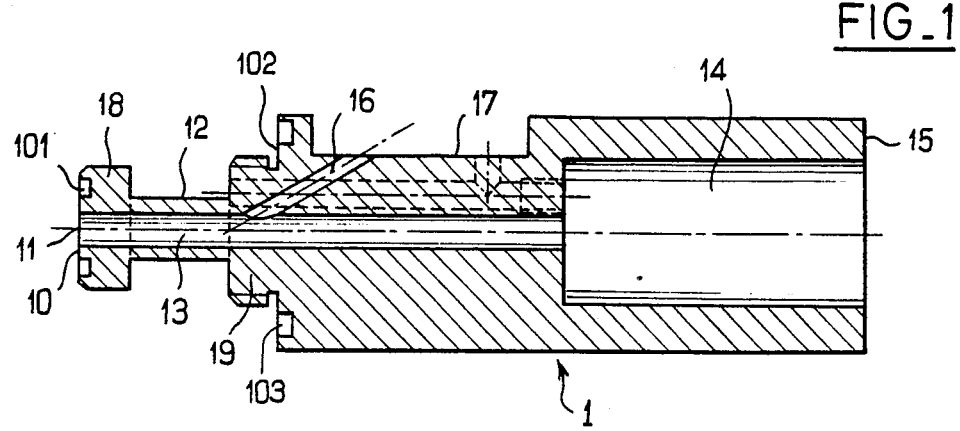
FIG_1
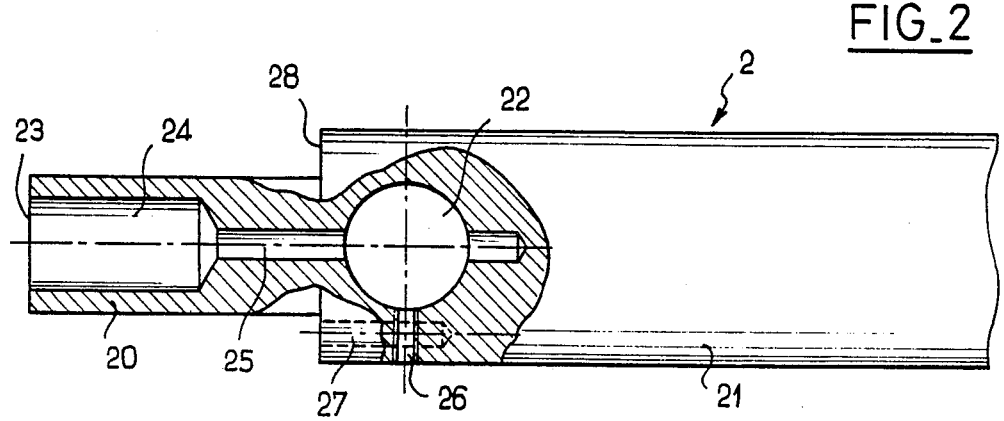
FIG_2
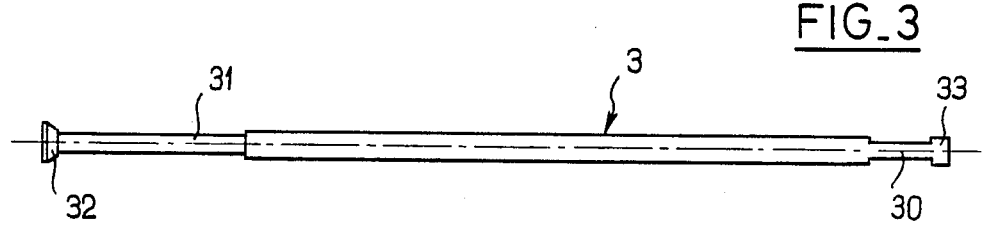
FIG_3
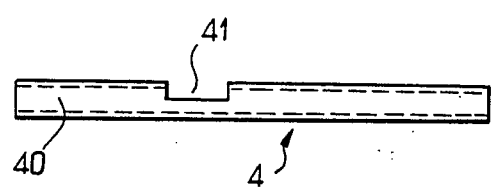
FIG_4

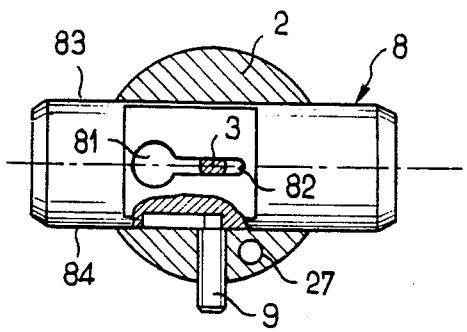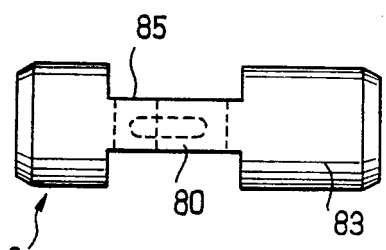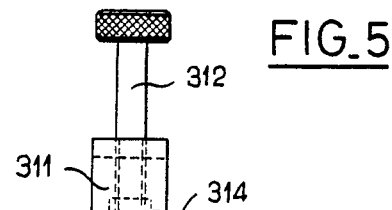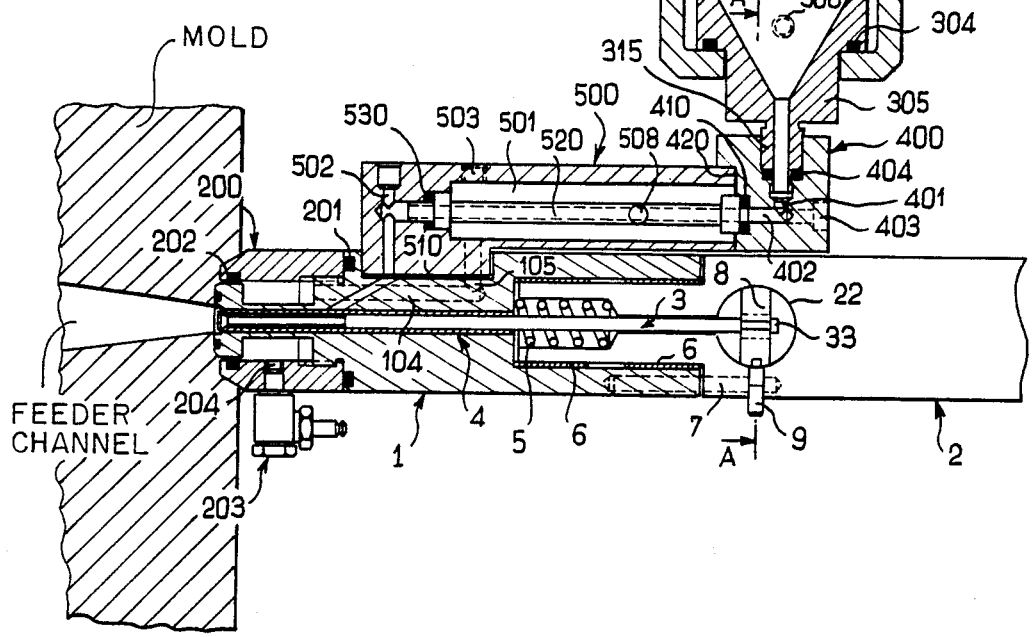

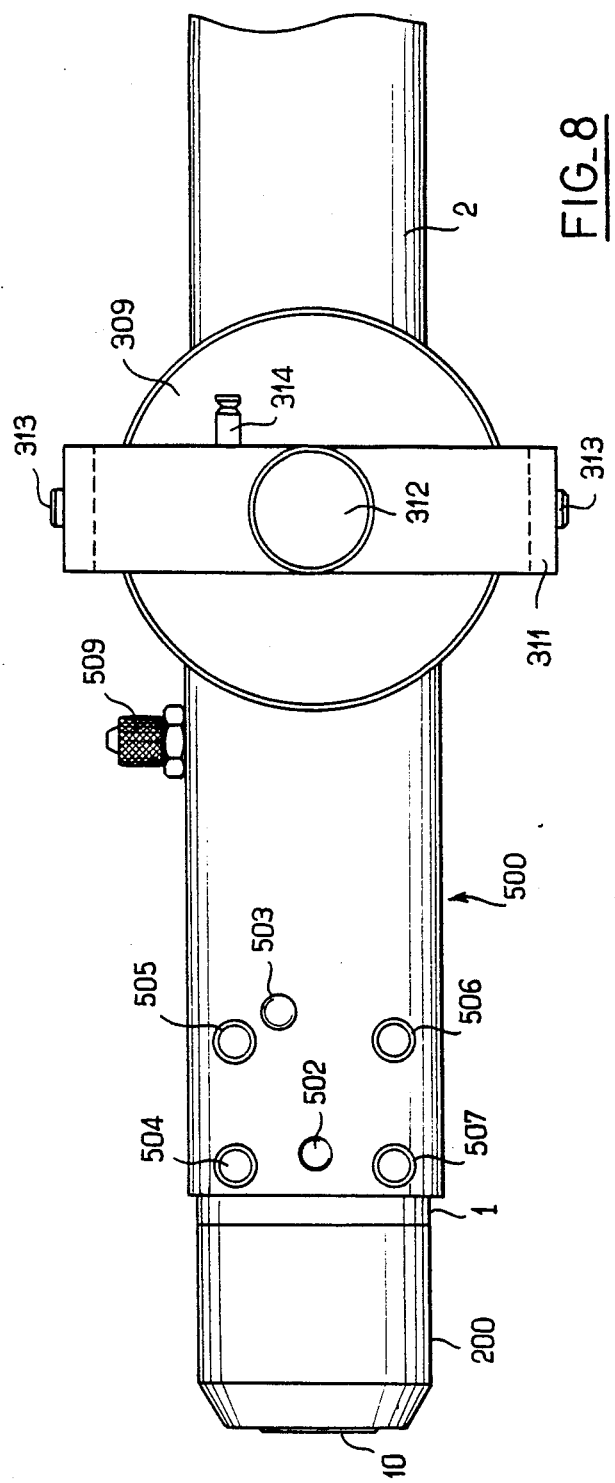
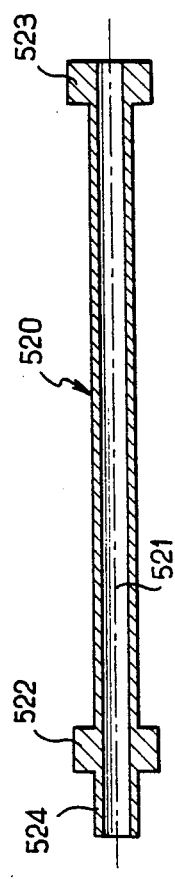
FIG_8
FIG_9

DEVICE FOR THE INJECTION OF A PLASTIC MATERIAL INTO A MOLD

BACKGROUND OF THE INVENTION

1. Field of the Invention

The present invention concerns a device for the injection of a plastic material, especially a thermosetting plastic material, into a mold. It concerns, notably, the coating of electronic components, such as capacitors.

2. Description of the Prior Art

Electronic components such as capacitors are generally coated with a plastic material designed to insulate and protect them from the effect of phenomena that could harm their operation, namely phenomena such as humidity, aggressive chemical agents, mechanical or electrical shocks, etc. It is preferred to coat electronic components with a thermosetting plastic material, which has the advantage after it is used, of being infusible and insoluble.

Thermosetting materials are materials that get converted, by chemical reaction, into three-dimensional macro-molecular compounds. Their use requires the effect of heat. Unlike thermoplastic materials, the chemical conversion process which has converted a thermosetting material into a thermoset material is irreversible. The non-melting quality of the thermoset plastic materials is of great importance for electronic components.

There are different known methods of molding. According to the compression molding method, the material to be molded is placed in an open hot mold which is then closed by means of a hydraulic press. Under the effect of heat and pressure imposed by the press, the material fluidizes and takes the shape of the mold. This method has some drawbacks: equipment is immobilized for long periods, the molding cycle is fairly long and burrs have to be removed.

In the transfer molding method, the material to be molded goes from a transfer pot or cavity, where the material is compressed and fluidized, into a hot mold that is kept firmly closed. The material is transferred to the mold by means of channels machined in the mold. The pressure exerted on the material to make it move forward in the channels of the mold contributes to its heating through frictional phenomena. This method gives a shorter baking time than the compression molding method, but this time is still too long for the fabrication of electronic components at a high rate. It calls for the application of greater pressure.

In the injection molding method, the thermosetting material is first fluidized by heating and then sent into a mold. This method enables total automation of the molding chain. There is neither manipulation nor loss of time between the end of plastification and the injection. It is by this method that the shortest baking times are obtained. The drawbacks of this method are the high degree of wear and tear of the screw and the relatively large amount of wastes due to the lengths of the sprues remaining in the mold.

In the application to electronic components, it is the injection molding method that appears to be the most promising one. It enables manufacture at a high rate according to an entirely automated molding cycle. However, the above-mentioned drawbacks are such that transfer molding continues to be widely used in employing a polyepoxy resin in powder form.

In order to enable total automation of a capacitor fabrication line, the present applicant has been led to develop an original device enabling the injection of a thermosetting plastic designed to fill capacitor packs. For this, it was necessary to find satisfactory approaches to enable molding under very low injection pressures (0.2 to 1 MPa), very short periods (30 to 40 seconds) of polymerization at low temperatures (about 100° C.) and a fairly long pot life (10 to 12 hours) of the hardener-resin mixture.

The device according to the invention enables the molding of liquid formulae, hence without pelleting and pre-heating operation. It enables the molding of parts that are very brittle mechanically (through the low injection pressure) and thermally (owing to the low temperature of the mold used).

The device according to the invention meets yet another requirement which is that of preventing all contact with the liquid resin which gives rise to allergies in users. For, through its design, the injection device remains clean after use, and the cleaning operations are thereby simplified.

The device according to the invention does not use any injection screw which has the drawback of getting quickly worn out.

Although the invention has been developed for a particular application concerning capacitors, the injection device may be used in other fields by those skilled in the art.

SUMMARY OF THE INVENTION

An object of the invention, therefore, is a device for the injection of a plastic material in a mold, the device comprising an injection head with an injection face provided with a hole designed to be placed in contact with the mold feeder channel, the injection head comprising an injection chamber, supplied with plastic material by a feeder conduit, the injection of the plastic material from the injection chamber to the mold feeder channel being done by means of a clack-valve system, the device also comprising a support of the injection head, wherein:

- the injection head is formed by a hollow part movable translationally with respect to its support, with a travel of a determined length;
- a rod, called an injection rod, is solidly joined to the head support by a first end and is placed in the injection head so that its second end is at the hole of the injection face;
- the length of the travel of the injection head with respect to its supprt is determined firstly, by a supporting stop and, secondly, by a stop at the second end of the injection rod;
- the injection chamber is formed by the inner volume of the hollow part forming the injection head and is demarcated by the injection rod, by the stop located at the second end of the injection rod and by means for imperviousness between the injection rod and injection head;
- elastic means move the injection head away from its support until the hole of the injection face is closed when the injection head and the stop of the second end of the injection rod are in contact, thus achieving the clack-valve system.

BRIEF DESCRIPTION OF THE DRAWINGS

The invention will be better understood and its other advantages will appear from the following description, given as a non-restrictive example, and made with reference to the appended FIGS. of which:

FIGS. 1 to 4 show different constituent elements of an injection device according to the invention;

FIG. 5 is a sectional view of this injection device;

FIGS. 6 and 7 show another constituent element of this injection device;

FIG. 8 is a top view of this injection device;

FIG. 9 shows another constituent element of this injection device.

DESCRIPTION OF PREFERRED EMBODIMENTS

As an example, the injection device which shall be described shall be used to inject a liquid thermosetting material into a mold. This means that the injection device should be cooled to preserve a temperature of the order of 20° C., and that the mold should be heated to between 80° and 200° C. Since, during injection, the mold will be in contact with the injection head, this head must be cooled at its closest point to the injection face to prevent the polymerization of the thermosetting material at this position. This device should therefore have conduits enabling the circulation of a heat transfer fluid which may quite simply be water.

According to the invention, the injection of plastic material is done by means of a clack-valve system obtained by the association of an injection rod, solidly joined to a support, and elastic means tending to move the injection head away from the support.

FIG. 1 shows an axial sectional view of the injection head 1 formed, in this example, by a generally cylindrical hollow part with an injection face 10 provided with a hole 11 designed to be put into contact with the canal for the feeding of a mold. In the vicinity of the injection face 10, there is a fairly deep and relatively wide groove 12. The hollow part of the injection head consists of cylindrical holes placed along the rotational axis of the injection head: a first hole 13, with a small diameter, reaching a part of the injection hole 11, formed by a flaring out of the hole 13, and extended, besides, by a second hole 14, opening out onto the rear face 15 of the injection head. The head also has a feeder conduit 16, drilled from a flat surface 17 machined on the cylindrical surface of the head, and opening out in the hole 13.

The groove 12 is inside two collars 18 and 19 with different diameters. The collar 18, which is limited by the injection face 10, has a smaller diameter than that of the collar 19. The injection face 10 has a circular groove 101 around the injection hole 11. The collar 19 is threaded. Behind this collar, the shoulder 102 has a circular groove 103.

FIG. 2 shows a partial sectional view of the injection head support. In this example, the support 2 is also cylindrical. It has a front part 20 with a smaller diameter than the rear part 21 of the support. The support has a lateral hole 22 drilled in it, and along its axis of revolution, a bore connecting the front face 23 of the support to the lateral hole 22. This bore, in the example considered, consists of two holes with different diameters: a first hole 24 opening out on the front face 23 and a second hole 25 opening out on the side hole 22. Other holes are also drilled in the support: the hole 26, drilled and tapped along an axis perpendicular to the axis of the hole 22 and reaching this hole, the hole 27 drilled from the shoulder 28 between the front part 20 and rear part 21 of the support. The functions of these holes will appear during the examination of the assembled injection device. The rear end of the part 21 which has not been shown, is machined so that the device can be fixed to a frame for example.

FIG. 3 shows the injection rod of the device. The injection rod 3 has, at one of its ends, a flattened part 30 which will serve to solidly join the rod to the support. The machining of this part has consisted, in the present case, in making two flat surfaces symmetrically with respect to the axis of the rod. The other end of the rod 3 has a part 31 with a smaller diameter than that of the rest of the rod. The part is ended by a widened part 32. The injection rod may be made of nitrided steel.

FIG. 4 shows an element of the device, called an injector tube, designed to be placed, by being force fitted or by sliding in snugly, into the injection head. The injection rod will slide into this injector tube. The injector tube 4 is a cylinder drilled from one side to the other with a hole 40. A notch 41 is made perpendicularly to its axis to give access to the hole 40. The length of the injector tube 4 may correspond to the length of the hole 13 of the injection head. The injector tube may be made of nitrided steel.

FIG. 5 shows a sectional view of an injection device according to the invention. This device has the injection head 1, the head support 2, the injection rod 3 and other elements.

Certain elements of the injection device have to be mounted in a precise order. The injector tube 4, which may or may not be coated with bonder, will first be placed in the injection head 1 and oriented so that its notch 41 is on the incoming face of the conduit 16 in the hole 13. The injector tube 4 and the hole 13 of the injection head have been machined so that a single layer of bonder provides perfect imperviousness between them. Once the injector tube is installed in the injection head, the injection rod may be positioned.

The injection head 1 is positioned on the support 2 by introducing the front part 20 of the support in the hole 14 of the head, the hole 24 of the support containing the spring 5. Since the injection head 1 is, for example, made of aluminium, and the support 2 may be made, for example, of steel, it is possible to provide for bronze or steel bushing 6 for the guidance of the head on the support. A stud 7 placed in the housing formed by two facing blind holes (one in the head and the other in the support and bearing the reference 27 in FIG. 2) permits only the translational movement of the head with respect to the support.

The injection rod 3 slides snugly into the injector tube, with a certain amount of clearance in the hole 25 of the support, and ends in the hole 22 of the support. It has been introduced so that its machined part 30 is in the hole 22, and so that its enlarged part 32 is at the injection hole 11. The rod 3 is solidly joined to the support 2 by means of a locking slide-bar 8.

FIG. 6 is a view along the section AA of FIG. 5 and shows the locking slide-bar in position in the support 2 fulfilling its function of fixing the injection rod 3. FIG. 7 is a top view of FIG. 6 and shows the locking slide-bar alone. The slide-bar has a central narrowed part 80 drilled with a housing formed by the association of a circular hole 81 and a slit 82. The fixing of the injection rod 3 is done by first placing the slide-bar 8 in the support 2 so that the circular hole 81 is in the axis of the support and, consequently, in the axis of the injection rod. It should be noted that the slide-bar 8 has two opposite faces 83 and 84 rounded out to the diameter of the hole 22, the result of which is that the slide-bar 8 can be shifted only in translational motion in this hole. The spring 5 tends to move the injection head 1 away from the support 2. In the idle position (the case of FIG. 5), there is a certain clearance (about 0.5 mm) between the injection head and its support. In pushing the injection head/rod set towards the support, the spring is compressed and the end 33 of the rod 3 goes behind the rear face 85 of the slide-bar 8. The slide-bar is then pushed further ahead in the support, the consequence of which is to make the flattened part 30 of the rod, correctly oriented, enter the slit 82. Since the width of the slit 82 enables the flattened part 30 to pass through but prevents the passage of the end 33, the injection rod is solidly joined to the support 2. A cap screw 9 screwed into the tapped hole 26 provides for the sure fixing of the slide-bar 8 into the support. In the idle position of the device (the case of FIG. 5) the spring 5 moves the injection head 1 from the support 2. This injection head 1 is then held back by the stop which forms the widened part 32 of the injection rod. The locking slide-bar may be made of chromium-alloy steel.

The injection device also has a ring 200 which gets screwed to the threaded collar 19. The imperviousness between the ring 200 and the collar 19 is provided by an O-ring 201 housed in the groove 103. Another O-ring 202, housed in an internal groove of the ring 200 provides for imperviousness between the ring and the collar 18. Thus, in the vicinity of the injection hole, there is a cavity which can contain a cooling liquid which can flow between a nozzle 203, screwed into a tapped hole 204 of the ring 200, and a conduit drilled in the injection head, and formed by two communicating holes 104 and 105. The hole 104 reaches the groove 12 and the hole 105 is drilled from the flat surface 17. The ring may be made of chromium-alloy steel.

The injection device also has a container of thermosetting material 300, some portions of which are shown in a sectional view, and others not. The container 300 has a casing 301 in which the greater part of a vessel 302 is plunged. The top of the casing 301 is screwed into the threaded part of the vessel. The imperviousness between the vessel and the casing is provided at this level by the O-ring 303. The bottom of the vessel 302 lies on a ring-shaped surface on the bottom of the casing 301, and the imperviousness at this level is provided by the O-ring 304. The vessel opens out at the bottom of the casing into a funnel-shaped part 305. The body of the vessel 302 has a cavity 306 along a certain height so as to form a cavity between the vessel and the casing. Two tapped holes 307 and 308 form an inlet and an outlet for a cooling fluid flowing in the cavity 306. A lid 309 closes the vessel with an interposed O-ring seal 310 housed in a ring-shaped groove of the tank. A flange 311, fitted with a clamping screw 312 and hinged on two bearing necks 313, solidly joined to the vessel, closes the vessel efficiently with resistance to injection pressures of the order of 1 MPa. The fluid providing the injection pressure is inserted into the vessel by means of a nozzle 314 going through the lid 309. The funnel-shaped part 305 is extended by a hollow groove 315 which is screwed into an element 400 of the injection device. The container may be made of chromium-alloy steel.

The element 400 is an elbow connector between the container 300 and an extension piece 500. It has two communicating and mutually perpendicular holes 401 and 402. The hole 402 goes through the element 400 from one side to the other to enable the cleaning of the element. A plug 403 blocks the end of the hole 402 during the working of the injection device. An O-ring 404 provides for the imperviousness of the link between the container 300 and the connector 400. The hole 401 provides for communication with the vessel 302 through the groove 315. The connector 400 is fixed to the extension piece 500 by means of screws (not shown). It may be made of chromium-alloy steel.

The main function of the extension piece 500 is to release the injection head 1. The large volume occupied by the vessel 300 is thus carried backwards. It has several holes: a main hole 501, almost throughout its length, having three portions of decreasing diameters, a through hole 502 communicating with the last portion of the hole 501 and drilled perpendicularly to the hole 501, holes 503 and 508 and other holes which will be used to fasten the extender 500 to the injection head 1. The hole 502 is thus designed to communicate with the feeder conduit 16 for the injection head. The hole 503 is designed to make the first portion of the hole 501 communicate with the hole 105 made in the injection head. The hole 508 drilled on the side of the extension piece opens out into the first portion of the hole 501. A flexible tube, external to the device and not shown herein, joins the hole 308 to the hole 508. The extension piece may be made of chromium-alloy steel.

FIG. 8 is a top view of the device shown in FIG. 5. The offset position of the holes 502 and 503 can be seen. This offset position is due to the fact that the conduits to which they provide access have to cross each other in the injection head without mutual intercommunication. The holes 502 and 503 are shown without their closing caps. The other four holes marked 504 to 507 are designed for the passage of screws that fasten the extension piece to the injection head. A seal 510 is interposed between the injection head 1 and the extension piece 500. This FIG. reveals the nozzle 509, giving access to the hole 508.

The extension piece 500 also has, inside the hole 501, a tube 520 (see FIG. 5) which is shown by itself in FIG. 9. The tube 520, drilled from one side to the other with a hole 521, has a collar 523 at one of its ends and a collar 522, in a slightly withdrawn position with respect to its other end 524. The tube 520 is installed by first inserting the end 524, on which a O-ring seal 530, abutting the collar 522, has been mounted, into the last portion of the hole 501. The collar 522 is housed in the last portion of the hole 501. The collar 523 is engaged in a fore hole of the hole 402 wherein an O-ring 410 has been previously placed. Finally, between the connector 400 and the extension piece 500, there is a seal 420. There are then two possible circuits in the extension piece 500 for the flow of fluids without mutual interference, owing to the use of seals.

The thermosetting material circuit is formed by the vessel 302 comprising the funnel-shaped part 305, the holes 401 and 402 of the connector 400, the hole 521 of the tube 520, the last portion of the hole 501 and the hole 502 of the extension piece 500, the feeder conduit 16 and the injection chamber located in the injection head 1. The injection chamber is formed by the ring-shaped space demarcated by the part 31 of the injection rod 3 and the injector tube 4.

The cooling circuit is formed by the cavity 306 of the container 300, the tube connecting the holes 308 and 508, the ring-shaped space within the wall of the hole of the extension piece and the portion of the tube 520 within the collars 522 and 523, the hole of the extension piece, the holes 105 and 104, and the groove 12 of the injection head, the hole 204 of the ring 200.

The circuit for injecting a thermosetting material according to the invention enables the thermosetting material to be preserved at a suitable temperature to prevent its polymerization in the injection chamber through the presence, in its immediate vicinity, of a large volume of heat transfer fluid.

The imperviousness means between the injection rod 3 and the injector tube 4 are made by tight adjustment between these two parts, the relative shift of which is very low (for example 0.5 mm).

In the idle position, the spring 5 pushes the injection head 1 till it comes to a stop before the enlarged part 32. The injection hole is then blocked by the application of the enlarged part 32 to the inlet of the injecting tube 4 which is chamfered accordingly.

The injection device can be suited to a standard vertical press, the automatic mechanisms of which have two timing systems: one approach cycle and one baking cycle. The approach cycle corresponds to the time during which the injection head is in contact with the mold (jelling time). The baking cycle corresponds to the time during which the mold is closed (polymerization time). The forward and backward motion of the injection device can take place through a jack controlled at the end of the closing of the press (pressure threshold). The injection head is provided with an O-ring seal housed in the circular groove 101 of the injection face 10. This seal should have high mechanical resistance to the cleaning solvent and may be formed by synthetic rubber based on a copolymer of vinylidene fluoride and of hexafluoropropylene, for example of the type having the brand name Viton.

During operation, the injection head 1 is pressed against the mold, the injection hole 11 being located in front of the mold feeder channel. This causes the shoulder 28 of the support 2 to come into contact with the rear face 15 of the injection head 1, as well as the compression of the spring 5. The support 2 causes the injection rod 3 to move towards the injection face and the thermosetting material may creep in the mold. Thus, an automatic clack-valve system has been made. This enables keeping the thermosetting material under permanent pressure in the container 300.

The molds that can be used are either molds in two parts, with injection in the mold joint of the parts to be molded and with vents, also in the mold joint, or molds in three parts with injection by the lower mold joint and vents in the upper mold joint The three-part molds give better molding for parts that are taller rather than wider and, in any case, provide for automatic removal of sprues. Whether the molds are made of two or three parts, vents of about 0.02 mm. are sufficient.

To enable the setting of a temperature gradient between the head and the mold, enabling accurate jelling and, consequently, easy cleaning of the mold, it is possible to provide for a hot point at the position of the injection. This hot point may be obtained by means of a heating resistor placed just beneath the surface of the mold and in the immediate vicinity of the supply channel.

The thermosetting material used may be based on epoxy resins of the DGEBA (diglycidyl ether of bisphenol A) type or on epoxidated novolaks. A typical composition may comprise a mixture of 90% by weight of Bakelite 0451 and 10% by weight of Rutapox 0302 to which might be added standard charges and additives.

The polymerization speed, allied with a long pot life, is made possible by the use of latent catalyzers, among which we might cite: boron trifluoride based amino-complexes, quaternary ammonium salts and amino-phenolic derivatives.

The device according to the invention can also be used for the injection of thermo-plastic materials. In this case, instead of providing for a circuit to cool the material to be injected, there should be provision for means to heat the head (by electrical resistors for example). The mold is then cold or lukewarm.

What is claimed is:

1. A control device for injection of a plastic material in a mold, the device comprising:
   an injection head with an injection face provided with a hole designed to be placed in contact with a mold feeder channel, the injection head including an injection chamber supplied with plastic material by a feeder conduit, the device further comprising a support for the injection head, and wherein the injection head is formed by a hollow part movable translationally with respect to the support, with a travel of a determined length;
   said device further comprising a rod solidly joined to the support at a first rod end, said rod being located in the injection head so that a second rod end is at the hole of the injection face;
   the length of the travel of the injection head with respect to said support is determined first by a stop on said support and second by a stop at the second end of the rod;
   the injection chamber is formed by an inner annular volume within the injection head;
   elastic means for moving the injection head away from said support until the hole of the injection face is closed when the injection head and the stop of the second rod end of the injection rod are in contact, and
   an injector tube placed inside the injection head, the rod snugly fitting into said injector tube, said injector tube having a notch enabling communication between the feeder conduit and the injection chamber when the injection head is in contact with said supporting stop allowing injection of the plastic material from the injection chamber to the mold feeder channel.

2. A control device according to claim 1, wherein said elastic means are formed by a spring placed in a hole of the support and biasing the injection head towards the second end of the injection rod.

3. A control device according to claim 2, wherein the plastic material to be injected is contained in a container having an inlet of fluid under pressure, the container being connected to said feeder conduit.

4. A control device according to claim 3, wherein a connection between the container and the feeder conduit is achieved by means of an extension piece, enabling the container to be withdrawn with respect to the injection face.

5. A control device according to claim 4, wherein the extension piece supports the container and enables transit of the plastic material towards the feeder conduit.

6. A control device according to claim 5 wherein said plastic material is a thermosetting material, and a circuit for cooling the device by circulation of a heat transfer fluid is provided.

7. A device for injecting plastic material in a mold, the device comprising an injection head with an injection face provided with a hole designed to be placed in contact with a mold feeder channel, the injection head formed by a hollow part movable along a length of travel with respect to a support, an injection rod solidly joined to the support by a first rod end and is placed in the injection head so that a second end of the injection rod is at the hole of the injection face, said length of travel of the injection head with respect to the support is determined first by a stop on the support and second by a stop at the second end of the injection rod, an injection chamber being formed by an inner volume of the hollow part forming the injection head, said injection chamber being bounded by a stepped portion of the injection rod, the stop located at the second end of the injection rod and by an injector tube located between the injection rod and the injection head, elastic means moving the injection head away from the support until the hole of the injection face is closed when the injection head and the stop of the second end of the injection rod are in contact, wherein said injector tube is also located inside the injection head, the injection rod going into the injector tube, said injector tube having a notch enabling communication between a feeder conduit and the injection chamber when the injection head is moved in contact with the support stop.

* * * * *